Figure 1:
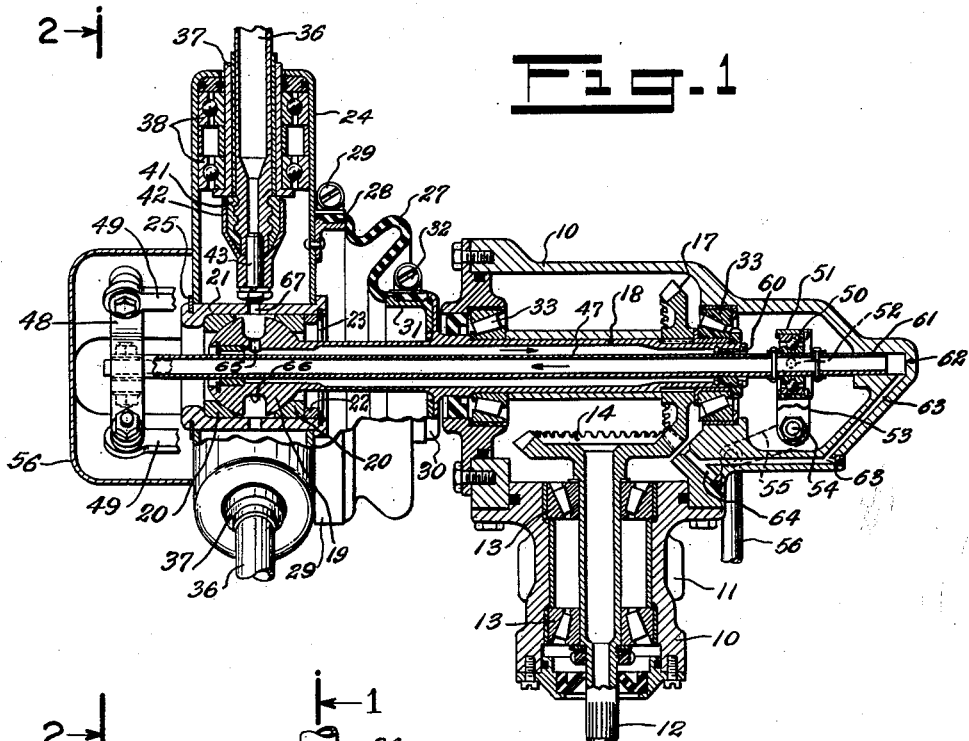

March 26, 1963   G. S. DOMAN ETAL   3,082,826
ROTOR HEAD WITH COLLECTIVE PITCH CONTROL
Filed July 2, 1958

INVENTORS
GLIDDEN S. DOMAN
STEPHEN DU PONT
BY
*Bohleba, Fassett & Montstream*
ATTORNEYS

United States Patent Office 3,082,826
Patented Mar. 26, 1963

3,082,826
ROTOR HEAD WITH COLLECTIVE PITCH CONTROL
Glidden S. Doman, Trumbull, and Stephen du Pont, Southbury, Conn., assignors to Doman Helicopters, Inc., Danbury, Conn., a corporation of Delaware
Filed July 2, 1958, Ser. No. 746,287
4 Claims. (Cl. 170—135.7)

The invention relates to a rotor head having solely collected pitch control of the blades. Although the rotor may be used as a main rotor it is designed particularly for the tail rotor of a helicopter. The rotor head is mounted on a universal joint for free planar displacement of the head. The head construction has a simplified form of axially flexible drive connection or boot between a drive shaft and the hub of the rotor head. In addition the collective pitch control is achieved by means of a rod extending through the drive shaft so that the collective pitch control spider or means is on the opposite side of the rotor hub from that of the flexible driving boot. There is no torque transmitted through the universal joint to the rotor head so that this joint provides for radial support and axial loads solely.

It is an object of the invention to construct a rotor for helicopters in which the rotor head is mounted for free planar variation with respect to the drive shaft and the torque or rotating drive is provided directly between the drive shaft and the blade hub through an axially flexible member with collective pitch control being provided on the opposite side of the hub from the flexible member.

Another object is to provide a non-tilting drive shaft for a tilting hub and hence a tilting rotor head.

A still further object is to construct a rotor head having an axially flexible tubular drive connection between a non-tiltable drive shaft and the tiltable rotor hub with the collective pitch change plate, star or spider being on the opposite side of the hub from the flexible drive connection so that there will be no variation of the volume and hence pressures within the flexible tubular drive connection when making a collective pitch change.

Another object is to provide a new lubrication system for the rotor head by providing a tubular collective pitch control rod which is smaller in diameter than the hollow drive shaft through which it passes so that a lubricating channel is provided through the tubular collective pitch control rod in one direction and returning lubricant flow is between the pitch control rod and the inner wall of the drive shaft.

Another object is to construct a rotor head such that the inboard extremity of each blade spar contacts or approximately contacts a shell for the ball joint thereby preventing the blade support bearings and associated parts from moving inwardly when the rotor is not turning.

Figure 2:
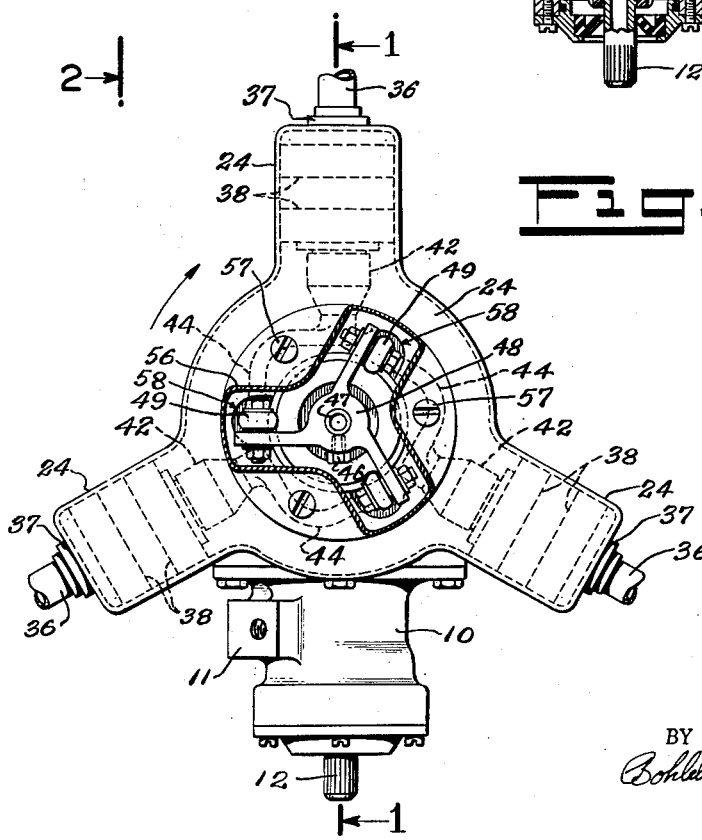

Other objects of the invention will be more apparent from the following description when taken in connection with the accompanying drawings illustrating a preferred embodiment thereof in which:

FIG. 1 is a section through the rotor head and blade spars taken on line 1—1 of FIG. 2, and FIG. 2 is an end view of the rotor head showing the blade spars only.

The rotor head includes a frame 10 of suitable construction and shown as an enclosed transmission housing having a mounting lug 11 by means of which the frame or housing is mounted on a helicopter fuselage. The frame carries an input shaft 12 mounted therein on bearings 13 and its protruding end is adapted to be connected with driving means such as the helicopter motor. The input shaft carries a bevel gear 14 on the end thereof.

Gear 14 meshes with a bevel gear 17 which is keyed or splined to a hollow drive shaft 18 which extends at right angles to the input shaft. The drive shaft is rotatably mounted in the frame or housing on bearings 33. At the end of this hollow drive shaft is a universal joint shown particularly as a ball joint including a ball 19 and spherical zone bearings 20 receiving the ball and permitting free angular movement of the zone bearings. The spherical zone bearings are carried by a ball joint shell 21. The ball and zone bearings are suitably retained in the shell such as by means of a spacer 22 and a retainer 23. A rotor hub 24 is mounted on the shell 21. There is no torque drive connection provided between the ball universal joint and the shell 21 and a hub 24 mounted thereon so that this joint carries solely radial and axial loads. The hub is retained on the shell by a retainer 25 and with the zone bearings is free to assume any angular position within the range of the joint.

A flexible drive connection is provided between the drive shaft 18 and the hub 24 through an axially flexible boot or sleeve 27, one end of which is secured to the hub such as being clamped on a flange 28 carried by the hub by a suitable clamping ring 29. The other end of the flexible driving connection or boot is secured to a flange 30 carried by the drive shaft through a cylindrical flange 31 secured to the flange 30. A clamping ring 32 clamps this end of the boot to the flange 31. Flexibility of the boot is secured by circular corrugations. Rotating drive or torque is transmited through the axially flexible boot 27 from the drive shaft 18 to the hub 24 since the boot is circumferentially inflexible. The axially flexible connection gives smooth constant velocity drive from the non-tilting drive shaft 18 to the tilting rotor hub 24. The boot 27 preferably is of rubber although it may be of metal or other suitable material. This flexible drive connection is on one side of the rotor hub.

The rotor head includes the hub 24 and a plurality of blades, each blade having a spar 36, the end of which is received in a spar bushing 37. The spar bushing and hence each blade is rotatably mounted in the hub 24 by suitable bearings 38. The blades are therefore mounted solely for pivotal movement on their longitudinal axes on the hub for gust stability and freedom from Corolis effect as described in Patent 2,648,387 dated August 11, 1953.

The end of the spar is anchored within the head by any suitable construction, that particularly illustrated including a split or two part thrust collar 41 which is received in a horn shell 42. The horn shell is secured to the end of the spar 36 by a bolt 43. A horn or horn arm 44 is shown as integral with the horn shell 42. It will be noted that the head of the bolt 43 abuts adjacent to the ball joint shell 21 and hence the inboard spar assembly including the spar end, spar bushing 37, the bearings 38, collar 41 and the horn or horn arm are retained against inward movement by the end of the bolt when the head is non-rotating. Centrifugal force, of course, retains this mechanism outwardly when the rotor is rotating.

Means is provided for collective pitch control of the blades of the rotor head. This collective pitch control means includes an axially movable control rod 47 which extends through the hollow drive shaft 18 and the ball 19. On the end of the control rod, there is secured by a screw 46, a plate, spider or star 48 which is connected throught a connecting link 49 for each blade with each links respective horn or horn arm 44 in the usual manner. The links pass through a hole 53 in the wall of the hub 24. Axial movement of the control rod is secured through a bearing 50 suitably secured to the control rod which bearing or the bearing shell 51 carries a pivot 52. This pivot is received in the arms of a fork or bell crank lever 53 within the frame or housing 10 which lever is pivotally mounted on the frame 10 by a pivot 54 forming a part of the bell crank lever which pivot projects outside of the frame. A connection 56 with the other arm 55 of the bell crank lever on the outside of the frame 10 provides a connection from the cabin of the aircraft to swing the bell crank and enables axial movement of the control rod 47 and the spider 48 for collective pitch control of the blades. An end cap or end housing 56 may be secured to the hub 24 such as by bolts 57 and enclose the spider or star 48 and the open end of the hub.

Preferably the control rod 47 is tubular and of a smaller diameter than the interior of the hollow drive shaft 18. The control rod is mounted within the hollow drive shaft such as on bearings 60. The end 61 of the control rod is received in a hole 62 in the frame 10 and this hole is connected through a lubricating passage shown as connecting holes 63 and 64 with the interior of the frame 10. As a consequence a circulating lubricating system is provided from the interior of the frame 10 through the connecting holes 64 and 63 to the frame hole 62 and then through the tubular control rod 47 to its end within the cap 56 and into the hub 24. A return channel is provided in the channel provided between the control rod 47 and the interior of the drive shaft 18 into the frame 10. Perforated or axially grooved bushings 60 may be used to pass lubricant therethrough. If solid bushing bearings 60 are used, a connection may be established through a hole 65, in the ball 19 to an annular groove 66 in the periphery of the ball and holes 67 through the joint shell 21 into the hub. Bearings and particularly roller bearings provide fluid pressure for lubricant flow through a fluid system. In addition, however, with the hole 63 into the interior of the frame at the point of mesh of the spur gear teeth of the spur gears 14 and 17, these gear teeth create fluid pressure into the hole 64 and through the fluid system.

This invention is presented to fill a need for improvements in a rotor head with collective pitch control. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A rotor mechanism for a helicopter comprising a frame, a hollow drive shaft rotatably mounted in the frame, a ball joint including a ball on the end of the drive shaft and bearings carried by the ball both of which are rotatable with the drive shaft, a rotor including a rotor hub mounted on the ball joint for free tilting thereon, an axially flexible and essentially circumferentially inflexible sleeve driving connection directly connected between the drive shaft and the rotor hub on the frame side of the hub, the sleeve completely enclosing the side of the hub, blades each having a longitudinal axis and mounted on the rotor hub solely for oscillating movement on its longitudinal axis for pitch variation, each blade having a spar the end of which projects into the hub, a horn on the end of each blade, a pitch change rod passing through the hollow drive shaft and the ball joint and projecting from each end of the latter, means mounting the pitch change rod for movement axially within the hollow drive shaft, pitch change means connecting the pitch change rod and the blade horns for pitch change of the blades and located on the other side of the hub from the flexible driving connection, an enclosing cap secured to the hub and surrounding the pitch change means to seal this side of the hub, means connected with the pitch change rod to axially move the same and the pitch change means, and means connected with the drive shaft to rotate the shaft and the rotor.

2. A rotor mechanism as in claim 1 in which the frame is an enclosing housing, in which the pitch change rod is tubular, an oil passage between the pitch change rod and the drive shaft connected with the rotor hub and the housing, the housing having a chamber at the inboard end of the control rod and receiving the end of the later, and an oil passage between the chamber and the interior of the housing.

3. A rotor mechanism as in claim 2 including an input shaft, bevel gears within the housing connecting the input shaft with the drive shaft and having a point of meshing teeth adjacent to the housing, and the oil passage having its open end in the housing adjacent to the meshing teeth of the bevel gears.

4. A rotor mechanism as in claim 1 in which the pitch change rod is tubular, and the frame is an enclosing housing, including a pair of bevel gears within the housing one of which is connected with the drive shaft and having a point of meshing gear teeth adjacent to the housing, a lubrication passage carried by the housing having an opening into the housing adjacent the meshing gear teeth and connected with the interior of the pitch change rod.

References Cited in the file of this patent

UNITED STATES PATENTS

| | | |
|---|---|---|
| 2,264,943 | Larsen | Dec. 2, 1941 |
| 2,704,128 | Papadakos | Mar. 15, 1955 |
| 2,727,577 | De Muth | Dec. 20, 1955 |
| 2,779,423 | Cushman | Jan. 29, 1957 |
| 2,795,284 | Sikorsky | June 11, 1957 |
| 2,961,051 | Wilford et al. | Nov. 22, 1960 |

FOREIGN PATENTS

| | | |
|---|---|---|
| 28,257 | Denmark | Aug. 29, 1921 |
| 476,596 | Great Britain | Dec. 13, 1937 |
| 737,097 | Great Britain | Sept. 21, 1955 |
| 947,583 | France | Jan. 10, 1949 |
| 504,803 | Canada | Aug. 3, 1954 |